United States Patent
Härdtl

[11] Patent Number: 4,474,894
[45] Date of Patent: Oct. 2, 1984

[54] DIELECTRIC ON THE BASIS OF LEAD TITANATES, METHOD OF MANUFACTURING SAME, AND A MULTILAYER CAPACITOR COMPRISING THE DIELECTRIC

[75] Inventor: Karl H. Härdtl, Aachen, Fed. Rep. of Germany

[73] Assignee: U.S. Philips Corporation, New York, N.Y.

[21] Appl. No.: 468,818

[22] Filed: Feb. 22, 1983

[30] Foreign Application Priority Data

Feb. 24, 1982 [DE] Fed. Rep. of Germany ....... 3206502

[51] Int. Cl.³ .............................................. C04B 35/46
[52] U.S. Cl. .................................... 501/136; 361/321; 501/135
[58] Field of Search ................................ 501/136, 135

[56] References Cited
U.S. PATENT DOCUMENTS 4,048,546 9/1977 Bouchard et al. .................. 501/136
4,063,341 12/1977 Bouchard ........................... 501/135

Primary Examiner—Helen M. McCarthy
Attorney, Agent, or Firm—Norman N. Spain

[57] ABSTRACT

A dielectric having a sintering temperature in the range from 800° to 1000° C. on the basis of lead titanates, in which at least 50 mol % of the titanium are substituted by Mg and W, the stoichiometric basic compound having the following composition:

$$Pb(Ti_{1-x-y}Mg_xW_y)O_3$$

wherein $$0.25 \leq x \leq 0.35$$

and $$0.25 \leq y \leq 0.35$$

and comprising an addition of 0.001 to 0.006 (5PbO+1-WO₃) on an additive molar basis.

12 Claims, 2 Drawing Figures

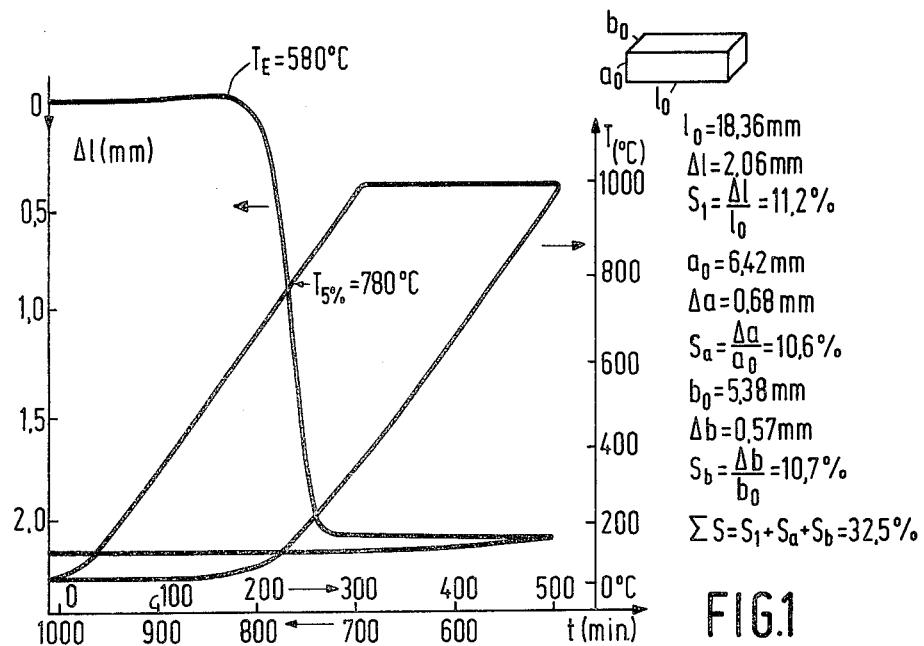
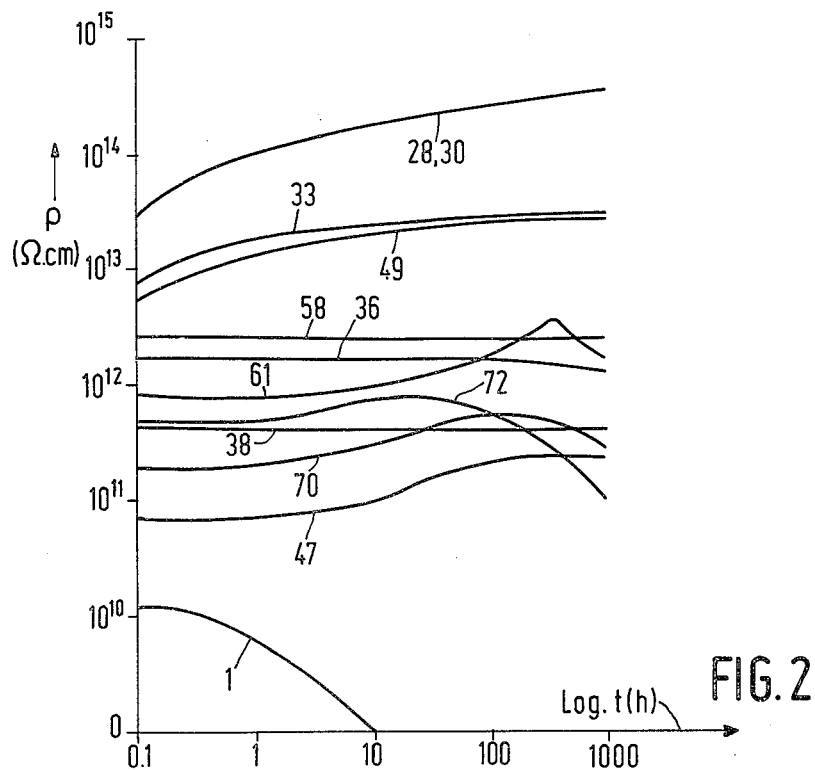

DIELECTRIC ON THE BASIS OF LEAD TITANATES, METHOD OF MANUFACTURING SAME, AND A MULTILAYER CAPACITOR COMPRISING THE DIELECTRIC

BACKGROUND OF THE INVENTION

The invention relates to lead titanate dielectrics in which at least 20 mol % of the titanium is substituted by magnesium and tungsten. The invention further relates to a method of manufacturing these dielectrics and to multilayer capacitors comprising the dielectric.

Dielectrics of the above type are of importance for the manufacture of capacitors, in particular multilayer capacitors. Monolithic ceramic multilayer capacitors can have very high capacities in a small volume and with great reliability. In manufacturing such capacitors the ceramic starting material is processed with a binder into thin ceramic foils. A metal paste is then provided on these ceramic foils to form the electrodes and subsequently the foils are stacked so that ceramic and metal layers alternate with each other.

Since the succession of layers of dielectric and metal lazers forming electrodes manufactured in this manner is sintered as one assembly, the electrode material and the sintering conditions must be chosen to be so that the metal layers neither melt nor oxidize.

It is known to manufacture multilayer capacitors in which the ceramic material is densely sintered in air at temperatures above 1300° C. At these sintering temperatures only noble metals having a very high melting-point for example palladium or platinum, can be used as metals for the electrodes.

Since noble metals are very expensive and relatively scarce and moreover, since their price, bears no relation whatsoever to that of the ceramic material, also since as a result of the already reached high extent of mechanization in manufacturing multilayer capacitors, the cost of the materials for electrodes from noble metal is particularly important, various attempts have been made to manufacture ceramic materials with useful dielectric values but at drastically reduced sintering temperatures in order to be able to dispense with the expensive electrodes of palladium or platinum and instead thereof to use silver electrodes. A ceramic dielectric comprising $PbTiO_3$-$Pb(Mg_{1/2}W_{1/2})O_3$ is known from U.S. Pat. No. 4,063,341. This dielectric, which can be sintered at temperatures from 950° to 1000° C., has a dielectric constant $\epsilon < 1000$ and exhibit values for the dielectric loss factor tan $\delta$ of 0.85 to 4.2% shows useful values. For the manufacture of multilayer capacitors from this ceramic material, teaches that the U.S. Pat. No. 4,063,341, silver should be used as a metal for the electrodes. It has now been found, however, that multilayer capacitors cannot be manufactured from this ceramic material in a reproducible quality while using silver electrodes since the sintering temperatures of this ceramic material is too close to the melting-point of the silver. However, because of its electrical properties, silver is excellently suitable as an electrode metal and, if possible, its use as an electrode should be maintained.

SUMMARY OF THE INVENTION

It is the object of the present invention to reduce the sintering temperatures for the ceramic material of the above-mentioned type in such manner as to be considerably below the melting-point of the silver and in a manner so that the electrical properties, in particular the values for the dielectric constant $\epsilon$ and the dielectric loss factor tan $\delta$, but also the resistivity and the variation thereof after the life tests are also improved with respect to the known ceramic material.

According to the invention this object is achieved by the addition to the stoichiometric basic compound having a composition $$Pb(Ti_{1-x-y}Mg_xW_y)O_3,$$

wherein $$0.25 \leq x \leq 0.35$$

and $$0.25 \leq y \leq 0.35$$

of from 0.001 to 0.006 of the eutectic combination $(5PbO + 1WO_3)$ on an additive molar basis.

As a result of the addition of the eutectic $(5PbO + 1WO_3)$ melting at 720° C., sintering temperatures in the range from 830° to 1000° C., in particular from 830° to 900° C., can be used and, additionally improved dielectric properties can be achieved. The values for the dielectric constant $\epsilon$ are between approximately 1500 to 5400, the value for the dielectric loss factor tan $\delta$ at 1 kHz are between approximately 1.6 to 3.1% and the values for the resistivity are between approximately $2 \times 10^{11}$ to $1 \times 10^{13}$ $\Omega$ cm at 25° C.

According to an further advantageous embodiment of the invention the dielectric has a composition corresponding to the following formula:

$$Pb(Ti_{1-(x+z)-y}Mg_{x-z}Me_zW_y)O_3 + 0.001 \text{ to } 0.006$$
$$(5PbO + 1WO_3)$$

wherein $$0.288 \leq x \leq 0.299$$

$$y = 0.3$$

$$0.001 \leq z \leq 0.012$$

When 0.1 to 1.2 mol % of the magnesium are substituted by at least one transition metal (Me) for example, Cr, Mn, Fe or Co, a significant improvement is obtained for the values for the resistivity besides the already obtained advantages of the favourable dielectric properties and of the low sintering temperature.

For example, a ceramic material on the basis of the said composition has values for the dielectric constant $\epsilon$ between 2300 to 6100, for the dielectric loss factor tan $\delta$ at 1 kHz between 0.3 to 3.1%, for the resistivity between $8 \times 10^{10}$ to $2 \times 10^{13}$ $\Omega$ cm at 25° C. The sintering temperature is between 830° to 1000° C., preferably between 830° to 900° C.

When in the process, after mixing and grinding, respectively, of the compounds forming the stoichiometric basic compound, a calcination process is carried out in the range from 700° to 750° C., the advantage is obtained that evaporation of PbO is avoided to a considerable extent.

The advantages resulting from the invention resides mainly in that ceramic dielectrics can be manufactured which reach their optimum ceramic, electric and dielectric properties at such low sintering temperatures that good multilayer capacitors can be obtained in a reproducible manner, even when the silver is used in a pure form as a metal for the electrodes.

A further advantage of the dielectrics according the invention is that the dielectric constant $\epsilon$ shows a comparatively small temperature dependence; a deviation from the $\epsilon$ value at ambient temperature of, if possible, of less than ±15% being suitable for practical purposes. For the temperature range between −55° C. and +125° C. slightly larger deviations are also suitable for practical purposes.

The following further advantages of the dielectrics according to the invention may be mentioned:

By the addition of (5PbO+1WO$_3$)-mixtures the sintering temperatures can be reduced by 100° to 150° C. as compared with prior art compositions. This is a decisive advantage in the manufacture of ceramic capacitors and in particular of multilayer capacitors, since the evaporation of lead decreases and the use of cheap silver electrodes becomes possible with a reproducibly good efficiency in, for example, multilayer capacitors.

By incorporating transition metal ions, for example, Mn, Cr, Fe and/or Co, the values for the resistivity increase in particular at 125° C. Only as a result of this do these dielectrics reach an insulation value which is sufficiently high for their use.

The incorporation of transition metal ions (in particular Mn and Cr) improves the life properties considerably so that as a result of this the materials may be used optimally as dielectrics for ceramic capacitors and in particular for multilayer capacitors. As a result of the incorporation of Mn, values for the loss factor tan $\delta$ can be reduced to values significantly below 1%.

BRIEF DESCRIPTION OF THE DRAWING

In the drawing:

FIG. 1 is a graph showing the shrinkage behaviour for a dielectric according to the invention.

FIG. 2 is a graph showing the variation of the resistivity (C) after the life test as a function of the time (t) of the dielectric according to U.S. Pat. No. 4,063,341 as compared with the various dielectrics according to the invention. The numerals refer to the compositions in the tables.

DETAILED DESCRIPTION OF THE PREFERRED EMBODIMENTS

The invention will be described in greater detail with reference to the drawing.

In order to be able to better define the sintering properties the shrinkage behaviour was examined for all samples at sintering temperatures by means of a dilatometer furnace. In the graph of FIG. 1 the shrinkage behaviour is given as a characteristic example for a dielectric of the following composition:

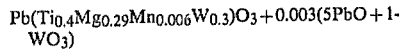

At a constant warming-up rate the dilatometer furnace used reached 1000° C. after 300 minutes, was kept at this temperature for 200 minutes and was cooled again at the same rate as for warming-up.

Parallel with this temperature variation (T) the shrinkage ($\Delta l$) of the various ceramic samples is measured as a function of the time (t).

In the following tables 1 to 8 the temperatures are indicated at which the shrinkage begins (T$_E$; for the samples according to FIG. 1, T$_E$=580° C.) and at which the shrinkage in the longitudinal direction has reached 5%. (T$_{5\%}$; for the sample according to the FIG. 1, T$_{5\%}$=780° C.). A shrinkage of 5% means that the density reached lies approximately half-way between the starting density of the green ceramic material and the theoretically possible density.

The FIG. 1 curve shows that the sample has reached the high final density already in the warming-up cycle at 900° C. and no noteworthy shrinkage occurs any longer in the isothermal phase at 1000° C.

Sintering temperatures of 900° C. then suffice for dielectrics of the following compositions:

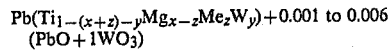

wherein $0.288 \leq x > 0.299$
$y = 0.3$
$0.001 \leq z \leq 0.012$ and

Me = transition metal(s).

In the following tables 1 to 8 there is furthermore plotted the sum of the relative shrinkage values $\Sigma S = \Delta a/a + \Delta b/b + \Delta l/l$ in %, where a, b and l are the lengths of the ribs of the tested samples.

Other characteristics of the samples are indicated are moreover the values for the dielectric constant $\epsilon$ at 25° C., the temperature of $\epsilon$ maximum in °C., the deviation of the $\epsilon$ value from the $\epsilon$ value at 25° C. at −55° C., −30° C., +10° C., +85° C. and +125° C. in =, as well as the values for the loss factor tan $\delta$ at 25° C. and 1 kHz in %.

The insulation resistance was measured at 25° C. and 125° C. In this measurement, a direct voltage of 240 V was applied to samples having a thickness of 0.5 mm and the current was determined one minute after applying the voltage. By this means the values for the resistivities indicated in the tables was obtained.

In a few compositions which have proved suitable for practical application for the manufacture of multilayer capacitors, a life test was carried out at 125° C. and a direct voltage field strength of 4 V/$\mu$m = 200 V/0.5 mm. The current flowing through the sample dependent on time was measured from which the resistivity was calculated.

TABLE 1

$Pb(Ti_{0.4}Mg_{0.3}W_{0.3})O_3 + X (5 PbO + 1 WO_3)$ added after calcination

| No. sample | Composition | Sinter. temp. [2h/°C] | Density [g/cm³] | Dilatometer-sintering $T_E$ [°C] | $T_5\%$ [°C] | $\Sigma S$ [%] | ε at 25° C. | ε-Maximum [°C] | ε-measurements Δε/ε in % −55° C. | −30° C. | +10° C. | +85° C. | +125° C. | tan δ in % [1 kHz, 25° C.] | resistivity [25° C. 240 Volt 500 μm] | [25° C. 240 Volt 500 μm] |
|---|---|---|---|---|---|---|---|---|---|---|---|---|---|---|---|---|
| 1 | x = 0 | 1000 | 8.25 | 640 | 860 | 28.3 | 4 200 | 25 | −26 | −10 | +1 | −11 | −33 | 1.9 | $1.10^{12}$ | $3.10^9$ |
| 2 | x = 0.001 | 800 | 8.20 | 580 | 780 | 34.2 | 1 600 | 130 | −26 | −15 | −4 | +17 | +26 | 2.9 | $4.10^{12}$ | $1.10^{11}$ |
| 3 | x = 0.001 | 830 | 8.61 | 580 | 780 | 34.2 | 3 200 | 62 | −32 | −19 | −4 | +2 | −10 | 2.8 | $6.10^{12}$ | $7.10^{10}$ |
| 4 | x = 0.001 | 900 | 8.63 | 580 | 780 | 34.2 | 4 800 | 26 | −32 | −14 | 0 | −17 | −39 | 2.3 | $6.10^{11}$ | $3.10^9$ |
| 5 | x = 0.001 | 1000 | 8.61 | 580 | 780 | 34.2 | 4 800 | 25 | −31 | −14 | 0 | −17 | −40 | 2.1 | $1.10^{12}$ | $2.10^9$ |
| 6 | x = 0.002 | 830 | 8.50 | 580 | 790 | 34.2 | 2 600 | 100 | −32 | −21 | −5 | +16 | +13 | 3.1 | $3.10^{12}$ | $3.10^{10}$ |
| 7 | x = 0.002 | 900 | 8.59 | 580 | 790 | 34.2 | 5 400 | 22 | −35 | −18 | −1 | −20 | −44 | 2.6 | $3.10^{12}$ | $1.10^{10}$ |
| 8 | x = 0.002 | 1000 | 8.62 | 580 | 790 | 34.2 | 5 000 | 12 | −31 | −14 | 0 | −21 | −43 | 2.0 | $4.10^{12}$ | $2.10^9$ |
| 9 | x = 0.003 | 830 | 8.53 | 590 | 790 | 34.3 | 2 900 | 78 | −31 | −19 | −4 | +8 | −1 | 2.9 | $6.10^{11}$ | $3.10^{10}$ |
| 10 | x = 0.003 | 900 | 8.58 | 590 | 790 | 34.3 | 5 300 | 20 | −35 | −17 | −1 | −19 | −43 | 2.4 | $4.10^{12}$ | $1.10^{10}$ |
| 11 | x = 0.003 | 1000 | 8.60 | 590 | 790 | 34.3 | 4 900 | 15 | −31 | −14 | 0 | −19 | −42 | 2.0 | $3.10^{12}$ | $1.10^{10}$ |
| 12 | x = 0.0045 | 830 | 8.57 | 570 | 780 | 34.1 | 4 300 | 38 | −35 | −20 | −2 | −10 | −31 | 2.8 | $8.10^{12}$ | $2.10^{10}$ |
| 13 | x = 0.0045 | 900 | 8.58 | 570 | 780 | 34.1 | 4 500 | 33 | −33 | −17 | −2 | −15 | −37 | 2.4 | $5.10^{12}$ | $5.10^{11}$ |
| 14 | x = 0.0045 | 1000 | 8.54 | 570 | 780 | 34.1 | 4 400 | 29 | −31 | −15 | −2 | −14 | −37 | 2.2 | $3.10^{12}$ | $2.10^9$ |
| 15 | x = 0.006 | 800 | 8.23 | 570 | 780 | 33.9 | 1 500 | 130 | −29 | −18 | −2 | +15 | +24 | 2.8 | $3.10^{12}$ | $7.10^{10}$ |
| 16 | x = 0.006 | 830 | 8.53 | 570 | 780 | 33.9 | 4 100 | 39 | −35 | −21 | −3 | −8 | −30 | 2.9 | $9.10^{12}$ | $2.10^{11}$ |
| 17 | x = 0.006 | 900 | 8.55 | 570 | 780 | 33.9 | 4 500 | 37 | −34 | −17 | −1 | −14 | −35 | 2.4 | $7.10^{12}$ | $3.10^9$ |
| 18 | x = 0.006 | 1000 | 8.53 | 570 | 780 | 33.9 | 4 200 | 28 | −30 | −14 | −1 | −15 | −29 | 2.1 | $2.10^{11}$ | $1.10^9$ |
| 19 | x = 0.009 | 830 | 8.51 | 580 | 770 | 32.3 | 3 800 | 45 | −34 | −21 | −3 | −7 | −35 | 2.8 | $4.10^{12}$ | $3.10^9$ |
| 20 | x = 0.009 | 900 | 8.51 | 580 | 770 | 32.3 | 4 000 | 30 | −32 | −15 | −1 | −13 | −37 | 2.3 | $1.10^{13}$ | $2.10^{11}$ |
| 21 | x = 0.009 | 1000 | 8.48 | 580 | 770 | 32.3 | 4 100 | 20 | −25 | −10 | +2 | −13 | −27 | 1.6 | $4.10^{11}$ | $7.10^8$ |
| 22 | x = 0.012 | 830 | 8.44 | 570 | 775 | 31.0 | 3 600 | 25 | −34 | −21 | −3 | −7 | −27 | 2.8 | $1.10^{13}$ | $7.10^{10}$ |
| 23 | x = 0.012 | 900 | 8.44 | 570 | 775 | 31.0 | 3 500 | 42 | −31 | −17 | −2 | −8 | −31 | 2.2 | $4.10^{12}$ | $3.10^9$ |
| 24 | x = 0.012 | 1000 | 8.40 | 570 | 775 | 31.0 | 3 400 | 45 | −27 | −14 | −1 | −9 | −30 | 1.9 | $9.10^{11}$ | $2.10^9$ |
| 25 | x = 0.015 | 830 | 8.36 | 570 | 765 | 29.2 | 3 200 | 51 | −35 | −23 | −6 | −6 | −25 | 2.6 | $6.10^{12}$ | $2.10^{11}$ |
| 26 | x = 0.015 | 900 | 8.36 | 570 | 765 | 29.2 | 3 200 | 45 | −29 | −15 | −1 | −9 | −28 | 1.6 | $9.10^{11}$ | $4.10^9$ |
| 27 | x = 0.015 | 1000 | 8.31 | 570 | 765 | 29.2 | 3 000 | 48 | −26 | −12 | −1 | −8 | −28 | 1.6 | $9.10^{11}$ | $1.10^9$ |

TABLE 2

$Pb(Ti_{0.4}Mg_{0.3-x}Mn_xW_{0.3})O_3 + 0.003 (5 PbO + 1 WO_3)$ added after calcination

| | | | | Dilatometer-Sintering | | | | |
|---|---|---|---|---|---|---|---|---|
| No. sample | Composition | Sinter. temp. [2h/°C.] | Density [g/cm³] | $T_E$ [°C.] | $T_5$ % [°C.] | $\Sigma S$ [%] | ε at 25° C. | ε-Maximum [°C.] |
| 28 | x = 0.001 | 900 | 8.63 | 580 | 780 | 32.5 | 5 100 | +12 |
| 29 | x = 0.001 | 1000 | 8.61 | 580 | 780 | 32.5 | 5 100 | +9 |
| 30 | x = 0.003 | 900 | 8.64 | 570 | 780 | 32.2 | 4 600 | +5 |
| 31 | x = 0.003 | 1000 | 8.63 | 570 | 780 | 32.2 | 4 800 | +5 |
| 32 | x = 0.006 | 850 | 8.44 | 605 | 790 | 33.3 | 2 600 | +82 |
| 33 | x = 0.006 | 900 | 8.55 | 605 | 790 | 33.3 | 4 400 | +5 |
| 34 | x = 0.006 | 1000 | 8.53 | 605 | 790 | 33.3 | 4 700 | −5 |
| 35 | x = 0.009 | 850 | 8.54 | 590 | 785 | 32.1 | 2 600 | +55 |
| 36 | x = 0.009 | 900 | 8.61 | 590 | 785 | 32.1 | 3 300 | +25 |
| 37 | x = 0.009 | 1000 | 8.56 | 590 | 785 | 32.1 | 4 100 | +5 |
| 38 | x = 0.012 | 900 | 8.48 | 605 | 790 | 33.0 | 3 100 | +52 |
| 39 | x = 0.012 | 1000 | 8.49 | 605 | 790 | 33.0 | 4 000 | +40 |
| 40 | x = 0.018 | 900 | 8.44 | 620 | 790 | 31.5 | 2 700 | +67 |
| 41 | x = 0.018 | 1000 | 8.50 | 620 | 790 | 31.5 | 3 300 | +50 |
| 42 | x = 0.030 | 850 | 8.43 | 595 | 780 | 31.4 | 2 300 | +80 |
| 43 | x = 0.030 | 900 | 8.56 | 595 | 780 | 31.4 | 2 700 | +70 |
| 44 | x = 0.030 | 950 | 8.52 | 595 | 780 | 31.4 | 3 000 | +60 |

| | ε-measurements Δ ε/ε in % | | | | | tan δ in % | resistivity [25° C. 240 Volt | [125° C. 240 Volt |
|---|---|---|---|---|---|---|---|---|
| No. sample | −55° C. | −30° C. | +10° C. | +85° C. | +125° C. | [1 kHz, 25° C.] | 500 μm] | 500 μm] |
| 28 | −32 | −13 | +2 | −20 | −43 | 1.7 | $1.10^{13}$ | $2.10^{12}$ |
| 29 | −29 | −11 | +4 | −23 | −45 | 1.4 | $1.10^{13}$ | $1.10^{12}$ |
| 30 | −27 | −9 | +3 | −15 | −39 | 0.9 | $1.10^{13}$ | $3.10^{12}$ |
| 31 | −29 | −9 | +3 | −20 | −43 | 0.9 | $9.10^{12}$ | $3.10^{12}$ |
| 32 | −24 | −12 | −4 | +7 | 0 | 1.0 | $6.10^{12}$ | $2.10^{12}$ |
| 33 | −22 | −6 | +2 | −13 | −36 | 0.7 | $5.10^{12}$ | $3.10^{12}$ |
| 34 | −19 | −1 | +4 | −22 | −43 | 0.6 | $5.10^{12}$ | $2.10^{12}$ |
| 35 | −18 | −8 | 0 | −1 | −18 | 0.4 | $5.10^{12}$ | $9.10^{11}$ |
| 36 | −18 | −6 | +1 | −10 | −31 | 0.4 | $4.10^{12}$ | $1.10^{12}$ |
| 37 | −17 | −3 | +2 | −17 | −39 | 0.4 | $4.10^{12}$ | $1.10^{12}$ |
| 38 | −18 | −11 | −2 | −2 | −20 | 0.7 | $2.10^{12}$ | $3.10^{11}$ |
| 39 | −21 | −10 | −2 | −12 | −34 | 0.7 | $2.10^{12}$ | $3.10^{11}$ |
| 40 | −26 | −18 | −5 | +5 | −3 | 1.1 | $1.10^{12}$ | $7.10^{10}$ |
| 41 | −24 | −18 | −4 | −6 | −27 | 1.1 | $5.10^{11}$ | $5.10^{10}$ |
| 42 | −31 | −25 | −7 | +12 | +1 | 1.7 | $5.10^{11}$ | $6.10^{9}$ |
| 43 | −33 | −26 | −7 | +9 | −7 | 1.9 | $5.10^{11}$ | $5.10^{9}$ |
| 44 | −34 | −27 | −6 | +4 | −16 | 2.0 | $5.10^{11}$ | $5.10^{9}$ |

TABLE 3

$Pb(Ti_{0.4}Mg_{0.3-x}Cr_xW_{0.3})O_3 + 0.003 (5 PbO + 1 WO_3)$ added after calcination

| | | | | Dilatometer-sintering | | | | |
|---|---|---|---|---|---|---|---|---|
| No. sample | Composition | Sinter. temp. [2h/°C.] | Density [g/cm³] | $T_E$ [°C.] | $T_5$ % [°C.] | $\Sigma S$ [%] | ε at 25° C. | ε-Maximum [°C.] |
| 45 | x = 0.001 | 900 | 8.60 | 560 | 780 | 33.1 | 5 000 | +25 |
| 46 | x = 0.001 | 1000 | 8.61 | 560 | 780 | 33.1 | 4 600 | +15 |
| 47 | x = 0.003 | 900 | 8.61 | 595 | 780 | 32.1 | 5 100 | +10 |
| 48 | x = 0.003 | 1000 | 8.54 | 595 | 780 | 32.1 | 4 800 | +24 |
| 49 | x = 0.006 | 900 | 8.55 | 615 | 780 | 31.2 | 4 300 | +31 |
| 50 | x = 0.006 | 1000 | 8.48 | 615 | 780 | 31.2 | 5 200 | +10 |
| 51 | x = 0.009 | 900 | 8.55 | 605 | 820 | 31.6 | 4 200 | +35 |
| 53 | x = 0.012 | 900 | 8.53 | 610 | 850 | 29.9 | 4 300 | +46 |
| 54 | x = 0.012 | 1000 | 8.36 | 610 | 850 | 29.9 | 5 200 | +18 |
| 55 | x = 0.018 | 900 | 8.52 | 620 | 855 | 29.7 | 4 100 | +56 |
| 56 | x = 0.018 | 1000 | 8.33 | 620 | 855 | 29.7 | 4 900 | +20 |

| | ε-measurements Δ ε/ε in % | | | | | tan δ in % | resistivity [25° C. 240 Volt | [125° C. 240 Volt |
|---|---|---|---|---|---|---|---|---|
| No. sample | −55° C. | −30° C. | +10° C. | +85° C. | +125° C. | [1 kHz, 25° C.] | 500 μm] | 500 μm] |
| 45 | −34 | −16 | 0 | −19 | −41 | 2.2 | $1.10^{13}$ | $2.10^{11}$ |
| 46 | −31 | −13 | 0 | −19 | −41 | 1.8 | $8.10^{12}$ | $5.10^{10}$ |
| 47 | −29 | −11 | +1 | −25 | −47 | 1.3 | $9.10^{12}$ | $7.10^{10}$ |
| 48 | −33 | −16 | −1 | −17 | −39 | 2.2 | $8.10^{12}$ | $1.10^{12}$ |
| 49 | −32 | −16 | −2 | −11 | −32 | 2.4 | $9.10^{12}$ | $1.10^{11}$ |
| 50 | −29 | −11 | +1 | −27 | −49 | 1.3 | $7.10^{12}$ | $1.10^{11}$ |
| 51 | −31 | −16 | −1 | −11 | −31 | 2.3 | $5.10^{12}$ | $9.10^{11}$ |
| 53 | −36 | −20 | −5 | −8 | −27 | 2.6 | $9.10^{12}$ | $2.10^{12}$ |
| 54 | −31 | −15 | 0 | −27 | −49 | 1.4 | $7.10^{11}$ | $3.10^{10}$ |
| 55 | −28 | −25 | −10 | −5 | −24 | 2.4 | $4.10^{12}$ | $2.10^{11}$ |

TABLE 3-continued

| | Pb(Ti$_{0.4}$Mg$_{0.3-x}$Cr$_x$W$_{0.3}$)O$_3$ + 0.003 (5 PbO + 1 WO$_3$) added after calcination | | | | | | | |
|---|---|---|---|---|---|---|---|---|
| 56 | −35 | −19 | −1 | −28 | −49 | 3.1 | 8.10$^{10}$ | 6.10$^9$ |

TABLE 4

Pb(Ti$_{0.4}$Mg$_{0.3-x}$Co$_x$W$_{0.3}$)O$_3$ + 0.003 (5 PbO + 1 WO$_3$) added after calcination

| No. sample | Composition | Sinter. temp. [2h/°C.] | Density [g/cm$^3$] | Dilatometer-sintering T$_E$ [°C.] | T$_5$ % [°C.] | Σ S [%] | ε at 25° C. | ε-Maximum [°C.] |
|---|---|---|---|---|---|---|---|---|
| 57 | x = 0.003 | 850 | 8.58 | 565 | 780 | 31.8 | 4 400 | +37 |
| 58 | x = 0.003 | 900 | 8.63 | 565 | 780 | 31.8 | 5 200 | +25 |
| 59 | x = 0.003 | 1000 | 8.59 | 565 | 780 | 31.8 | 5 000 | +20 |
| 60 | x = 0.006 | 850 | 8.58 | 565 | 780 | 32.5 | 4 200 | +37 |
| 61 | x = 0.006 | 900 | 8.62 | 565 | 780 | 32.5 | 5 100 | +24 |
| 62 | x = 0.006 | 1000 | 8.62 | 565 | 780 | 32.5 | 4 900 | +25 |
| 63 | x = 0.009 | 850 | 8.40 | 565 | 775 | 32.6 | 2 800 | +87 |
| 64 | x = 0.009 | 900 | 8.56 | 565 | 775 | 32.6 | 5 500 | +25 |
| 65 | x = 0.009 | 950 | 8.61 | 565 | 775 | 32.6 | 5 700 | +15 |
| 66 | x = 0.009 | 1000 | 8.59 | 565 | 775 | 32.6 | 5 900 | +10 |
| 67 | x = 0.012 | 850 | 8.57 | 580 | 780 | 32.4 | 3 400 | +54 |
| 68 | x = 0.012 | 900 | 8.63 | 580 | 780 | 32.4 | 5 100 | +23 |
| 69 | x = 0.012 | 1000 | 8.61 | 580 | 780 | 32.4 | 4 800 | +25 |

| No. sample | ε-measurements Δε/ε in % −55° C. | −30° C. | +10° C. | +85° C. | +125° C. | tan δ in % [1 kHz, 25° C.] | resistivity [25° C. 240 Volt 500 μm] | [125° C. 240 Volt 500 μm] |
|---|---|---|---|---|---|---|---|---|
| 57 | −34 | −19 | −2 | −9 | −30 | 2.7 | 6.10$^{12}$ | 2.10$^{12}$ |
| 58 | −36 | −17 | −1 | −18 | −42 | 2.4 | 2.10$^{13}$ | 1.10$^{12}$ |
| 59 | −32 | −15 | 0 | −19 | −42 | 1.8 | 8.10$^{12}$ | 1.10$^{10}$ |
| 60 | −34 | −20 | −3 | −10 | −30 | 2.6 | 1.10$^{13}$ | 2.10$^{12}$ |
| 61 | −33 | −17 | −1 | −19 | −41 | 2.1 | 5.10$^{12}$ | 2.10$^{11}$ |
| 62 | −33 | −15 | −1 | −19 | −42 | 1.8 | 3.10$^{12}$ | 1.10$^{10}$ |
| 63 | −32 | −20 | −2 | +12 | +5 | 2.9 | 7.10$^{12}$ | 1.10$^{12}$ |
| 64 | −36 | −17 | 0 | −21 | −44 | 2.4 | 8.10$^{12}$ | 1.10$^{12}$ |
| 65 | −34 | −14 | 0 | −27 | −49 | 1.6 | 4.10$^{12}$ | 8.10$^{10}$ |
| 66 | −30 | −12 | +2 | −28 | −51 | 1.2 | 1.10$^{13}$ | 7.10$^{10}$ |
| 67 | −32 | −20 | −4 | −2 | −16 | 2.7 | 8.10$^{12}$ | 6.10$^{11}$ |
| 68 | −42 | −27 | −1 | −29 | −48 | 1.9 | 1.10$^{12}$ | 2.10$^{10}$ |
| 69 | −34 | −19 | −1 | −17 | −39 | 2.2 | 3.10$^{11}$ | 2.10$^9$ |

TABLE 5

Pb(Ti$_{0.4}$Mg$_{0.3-x}$Fe$_x$W$_{0.3}$)O$_3$ + 0.003 (5 PbO + 1 WO$_3$) added after calcination

| No. sample | Composition | Sinter. temp. [2h/°C.] | Density [g/cm$^3$] | Dilatometer-sintering T$_E$ [°C.] | T$_5$ % [°C.] | Σ S [%] | ε at 25° C. | ε-Maximum [°C.] |
|---|---|---|---|---|---|---|---|---|
| 70 | x = 0.003 | 900 | 8.63 | 575 | 780 | 31.9 | 6 000 | +16 |
| 71 | x = 0.003 | 1000 | 8.60 | 575 | 780 | 31.9 | 5 400 | +10 |
| 72 | x = 0.006 | 900 | 8.64 | 580 | 780 | 31.3 | 5 100 | +25 |
| 73 | x = 0.006 | 1000 | 8.58 | 580 | 780 | 31.3 | 5 800 | +7 |
| 74 | x = 0.009 | 900 | 8.64 | 590 | 780 | 32.2 | 5 000 | +28 |
| 75 | x = 0.009 | 1000 | 8.59 | 590 | 780 | 32.2 | 5 600 | +6 |
| 76 | x = 0.012 | 900 | 8.64 | 575 | 775 | 33.0 | 4 800 | +33 |
| 77 | x = 0.012 | 1000 | 8.56 | 575 | 775 | 33.0 | 6 100 | +10 |

| No. sample | ε-measurements Δε/ε in % −55° C. | −30° C. | +10° C. | +85° C. | +125° C. | tan δ in % [1 kHz, 25° C.] | resistivity [25° C. 240 Volt 500 μm] | [125° C. 240 Volt 500 μm] |
|---|---|---|---|---|---|---|---|---|
| 70 | −36 | −17 | 0 | −24 | −45 | 2.2 | 2.10$^{13}$ | 1.10$^{12}$ |
| 71 | −30 | −11 | +1 | −23 | −46 | 1.7 | 8.10$^{12}$ | 1.10$^{10}$ |
| 72 | −36 | −19 | −1 | −19 | −40 | 2.4 | 5.10$^{12}$ | 8.10$^{11}$ |
| 73 | −32 | −12 | +2 | −28 | −51 | 1.4 | 1.10$^{13}$ | 1.10$^{10}$ |
| 74 | −36 | −19 | −1 | −16 | −38 | 2.4 | 4.10$^{12}$ | 1.10$^{12}$ |
| 75 | −30 | −10 | +2 | −27 | −50 | 1.4 | 5.10$^{12}$ | 7.10$^9$ |
| 76 | −36 | −20 | −3 | −13 | −34 | 2.6 | 8.10$^{12}$ | 2.10$^{12}$ |
| 77 | −34 | −14 | +3 | −32 | −55 | 1.7 | 1.10$^{13}$ | 4.10$^{11}$ |

TABLE 6

$Pb(Ti_{0.4}Mg_{0.294}Mn_{0.003}Cr_{0.003}W_{0.3})O_3 + 0.003 (5 PbO + 1 WO_3)$ added after calcincation

| No. sample | Sinter. temp. [2h/°C.] | Density [g/cm³] | Dilatometer-sintering $T_E$ [°C.] | $T_5\%$ [°C.] | $\Sigma S$ [%] | $\epsilon$ at 25° C. | $\epsilon$-Maximum [°C.] | $\Delta \epsilon/\epsilon$ in % −55° C. | −30° C. | +10° C. | +85° C. | +125° C. | tan δ in % [2 kHz, 25° C.] | resistivity [25° C. 240 Volt 500 μm] | [125° C. 240 Volt 500 μm] |
|---|---|---|---|---|---|---|---|---|---|---|---|---|---|---|---|
| 78 | 900 | 8.60 | 600 | 775 | 32.2 | 900 | +10 | −25 | −9 | +2 | −9 | −30 | 1.0 | $4.10^{12}$ | $2.10^{11}$ |
| 79 | 1000 | 8.54 | 600 | 775 | 32.2 | 5 100 | 0 | −15 | −3 | +5 | −27 | −49 | 0.6 | $1.10^{13}$ | $2.10^{12}$ |

TABLE 7

$Pb(Ti_{0.4}Mg_{0.294}Mn_{0.006}W_{0.3})O_3$ + x eutectic addition

| No. sample | Composition | Sinter. temp. [2h/°C.] | Density [g/cm³] | Dilatometer-sintering $T_E$ [°C.] | $T_5\%$ [°C.] | $\Sigma S$ [%] | $\epsilon$ at 25° C. | $\epsilon$-Maximum [°C.] |
|---|---|---|---|---|---|---|---|---|
| 80 | x = A | 900 | 8.68 | 565 | 780 | 33.6 | 3 600 | +5 |
| 81 | x = A | 1000 | 8.64 | 565 | 780 | 33.6 | 4 200 | 0 |
| 82 | x = E | 900 | 8.33 | 585 | 850 | 33.8 | 3 700 | +57 |
| 83 | x = E | 1000 | 8.61 | 585 | 850 | 33.8 | 4 400 | −2 |
| 84 | x = F | 900 | 8.56 | 590 | 815 | 32.4 | 4 000 | +4 |
| 85 | x = F | 1000 | 8.58 | 590 | 815 | 32.4 | 4 700 | −5 |
| 86 | x = G | 900 | 8.64 | 585 | 775 | 33.1 | 3 900 | +5 |
| 87 | x = G | 1000 | 8.61 | 585 | 775 | 33.1 | 4 600 | −3 |
| 88 | x = H | 900 | 8.54 | 575 | 770 | 32.8 | 3 800 | +6 |
| 89 | x = H | 1000 | 8.51 | 575 | 770 | 32.8 | 3 700 | +7 |
| 90 | x = I | 900 | 8.60 | 575 | 780 | 33.4 | 4 300 | 0 |
| 91 | x = I | 1000 | 8.60 | 575 | 780 | 33.4 | 4 700 | −5 |
| 92 | x = K | 900 | 8.58 | 570 | 780 | 33.6 | 3 800 | +3 |
| 93 | x = K | 1000 | 8.56 | 570 | 780 | 33.6 | 3 800 | +3 |

| No. sample | $\epsilon$-measurements $\Delta \epsilon/\epsilon$ in % −55° C. | −30° C. | +10° C. | +85° C. | +125° C. | tan δ % [1 kHz, 25° C.] | resistivity [25° C. 240 Volt 500 μm] | [125° C. 240 Volt 500 μm] |
|---|---|---|---|---|---|---|---|---|
| 80 | −25 | −6 | +3 | −15 | −37 | 0.5 | $7.10^{12}$ | $2.10^{12}$ |
| 81 | −19 | −3 | +3 | −16 | −39 | 0.4 | $7.10^{12}$ | $1.10^{12}$ |
| 82 | −20 | −9 | 0 | −2 | −24 | 0.7 | $4.10^{12}$ | $5.10^{12}$ |
| 83 | −17 | −2 | +4 | −22 | −44 | 0.4 | $8.10^{12}$ | $2.10^{12}$ |
| 84 | −19 | −5 | +2 | −12 | −34 | 0.5 | $6.10^{12}$ | $4.10^{12}$ |
| 85 | −17 | −1 | +3 | −19 | −42 | 0.3 | $5.10^{12}$ | $6.10^{12}$ |
| 86 | −21 | −7 | +1 | −7 | −30 | 0.6 | $5.10^{12}$ | $5.10^{12}$ |
| 87 | −18 | −7 | +4 | −19 | −42 | 0.4 | $7.10^{12}$ | $4.10^{12}$ |
| 88 | −21 | −7 | +2 | −14 | −34 | 0.6 | $8.10^{12}$ | $3.10^{12}$ |
| 89 | −23 | −11 | 0 | −15 | −33 | 0.5 | $6.10^{12}$ | $3.10^{12}$ |
| 90 | −19 | −3 | +3 | −13 | −37 | 0.5 | $6.10^{12}$ | $4.10^{12}$ |
| 91 | −17 | 0 | +4 | −20 | −43 | 0.3 | $7.10^{12}$ | $3.10^{12}$ |
| 92 | −20 | −5 | +2 | −13 | −34 | 0.5 | $7.10^{12}$ | $4.10^{12}$ |
| 93 | −20 | −5 | +3 | −12 | −32 | 0.5 | $2.10^{12}$ | $3.10^{12}$ |

A = 0.003 (5 PbO + 1 WO₃) added prior to calcination (directly upon weighing)
E = 0.003 (1 WO₃) added after calcination
F = 0.003 (2 PbO + 1 WO₃) added after calcination
G = 0.003 (5 PbO + 1 WO₃) added after calcination
H = 0.003 (10 PbO + 1 WO₃) added after calcincation
I = 0.003 (1 PbO) added after calcination
K = 0.003 (5 PbO) added after calcination

TABLE 8

Multilayer capacitors $Pb(Ti_{0.4}Mg_{0.294}Mn_{0.006}W_{0.3})O_3 + 0.003 (5 PbO + 1 WO_3)$ added after calcination

| No. sample | Sinter. temp. [2h/°C.] | Density [g/cm³] | Dilatometer-sintering $T_E$ [°C.] | $T_5\%$ [°C.] | $\Sigma S$ [%] | $\epsilon$ at 25° C. | $\epsilon$-Maximum [°C.] | $\Delta \epsilon/\epsilon$ in % −55° C. | −30° C. | +10° C. | +85° C. | +125° C. | tan δ % [1 kHz, 25° C.] | resistivity [25° C. 240 Volt 500 μm] | [125° C. 240 Volt 500 μm] |
|---|---|---|---|---|---|---|---|---|---|---|---|---|---|---|---|
| 94 | 850 | — | — | — | — | 2 800 | +10 | −17 | −5 | −1 | −9 | −29 | 0.6 | $7.10^{12}$ | $5.10^{12}$ |
| 95 | 900 | — | — | — | — | 3 800 | +5 | −22 | −6 | +3 | −11 | −34 | 0.7 | $6.10^{12}$ | $2.10^{12}$ |
| 96 | 930 | — | — | — | — | 3 800 | +5 | −18 | −5 | +2 | −12 | −35 | 0.7 | $1.10^{13}$ | $8.10^{12}$ |

Explanation of the measured results of Tables 1 to 8.
1. Reduction of the sintering temperature by the addition of (5PbO+1WO₃).

Sample No. 1 of Table 1 is a prior art dielectric. Although a $T_{5\%}$ value of 860° C. was found from the dilatometer measurements, this composition still shows an open porosity after sintering two hours at 900° C. and hence is unfit as a dielectric for capacitors. After sintering at 1000° C. a density of 8.25 g/cm³ was found, which with a theoretical density of 8.73 g/cm³ means that there is still a porosity of 5 to 6%. Although a sufficient density for a capacitor dielectric is reached herewith, no optimum values for the dielectric constant $\epsilon$ can be reached at values for the density of approximately 8.25 g/cm³; these occur only at densities be better than 8.4 to 8.5 g/cm$^3$ (porosity <3%). Since the optimum density can be reached only at a sintering temperature of more than 1000° C., this composition is unfit as a dielectric for sintering together with silver electrodes since the (melting-point for silver=960.5° C.).

The sintering temperature of the basic compound of the following composition:

$$Pb(Ti_{1-x-y}Mg_xW_y)O_3$$

wherein $$0.25 \leq x \leq 0.35$$

and $$0.25 \leq x \leq 0.35$$

can be considerably reduced by an addition of (5PbO+1WO$_3$) in the range from 0.001 to 0.006 on an additive molar basis.

It will be obvious from table 1 that the T$_{5\%}$ value can be reduced from 860° C. for the sample No. 1 (prior art composition) to values down to 765° C. for the samples No.2 to No.27 (compositions according to the invention). Whereas sample No. 1 still shows an open porosity in sintering circumstances of two hours and 900° C., the samples having compositions according to the invention can densely sintered even at temperatures as low as 800° C. With an increasing (5PbO+1WO$_3$) addition the $\epsilon$ value is increased and reaches a maximum with an addition of 0.002 to 0.003 with 5400 and 5300, respectively.

2. Resistivity, dielectric losses and $\epsilon$ (T) characteristic by incorporating transition metals.

The influence of incorporating transition metals (Cr, Mn, Fe and/or Co) in the basic compound of the following composition:

$$Pb(Ti_{1-(x+z)-y}Mg_xMe_zW_y)O_3 + 0.003(5\text{-}PbO+1WO_3)$$

wherein $$0.288 \leq x \leq 0.299$$

$$y = 0.3$$

$$0.001 \leq z \leq 0.012$$

and

Me=transition metal(s) is shown in the table 2.8.

Table 2:

The incorporation of Mn improves the dielectric properties of the ceramic material essentially without influencing the good sintering properties. In particular at 125° C., the resistivity increases to 10$^3$ with respect to the No. 1 sample, table 1 (prior art ceramic material). The dielectric losses drop below 1% and the $\epsilon$ (T) characteristic also becomes flatter.

Tables 3, 4 and 5:

Improvements of the dielectric properties with respect to the No. 1 sample in table 1 also occurs by incorporating Cr, Fe and/or Co in the basic compound of the following composition:

$$Pb(Ti_{1-(x+z)-y}Mg_xMe_zW_y)O_3 + 0.003(5\text{-}PbO+1WO_3)$$

wherein $$0.288 \leq x \leq 0.299$$

$$y = 0.3$$

$$0.001 \leq z \leq 0.012$$

and

Me=transition metal(s).

The values for the dielectric constant $\epsilon$ increase to 6000 (sample No. 70) and the value for the resistivity has also improved to an order of magnitude of 3.

In Table 6 the results are recorded of a combined incorporation of 0.3 mol% Mn and 0.3 mol% of Cr.

Table 7:

Various quantities of PbO+WO$_3$ were added to the constant basic compound Pb(Ti$_{0.4}$Mg$_{0.294}$Mn$_{0.006}$W$_{0.3}$)O$_3$. The following conclusions may be drawn from the results of Table 7: the addition may take place already prior to calcination even immediately upon weighing the basic substances (for that purpose reference is made to samples No. 80 and 81 in comparison with samples No. 33 and 34).

It is not strictly necessary to add PbO and WO$_3$ in the form of (5PbO+1WO$_3$), which corresponds to the eutectic composition. However, a PbO overdose of approximately 1 mol% is essential.

Samples with an addition of only WO$_3$ (see sample No. 82) show a density of only 8.33 g/cm$^3$ at a sintering temperature of 900° C. The PbO overdose is not very critical; however, an addition of 0.003 (5PbO+1-WO$_3$) is recommended as optimum.

An important property of materials for ceramic capacitors is the behaviour in the life test. This means that for capacitors their electrical properties, in particular their value for the resistivity, should be maintained also after a load lasting 1000 hours with high direct voltage field strength (4 V/$\mu$m) at elevated temperatures (125° C. for the specification X7R, 85° C. for the specification Z5U).

The results of the measurements for the lift test at 125° C. are recorded in FIG. 2. Whereas the prior art composition (sample No. 1 in Table 1) shows a considerably lower resistivity already after 1 hour and shows an electric breakdown after 10 hours, the samples having a small addition of Mn or Cr (samples No. 28, 30) in particular have a resistivity which increases in time to more than 10$^{14}$ $\Omega$ cm. Samples having a high Mn content (samples No. 36, 38) as well as samples having a Co content of 0.3 mol% (sample No. 58) show a resistivity which is independent of time.

As starting materials for the perowskite basic compound there may be employed PbO, MgO, WO$_3$, TiO$_2$, Mn-acetate, Co-oxalate Fe-oxalate and Cr$_2$O$_3$ in an extremely pure quality. The basic substances are weighed in accordance with the molar quantities indicated in the tables; instead of the oxalates or acetate, in principle also carbonates or other compounds which can be decomposed at the calcination temperature may be used. The powdered basic substances are ground dry for 3 hours, then presintered at temperatures between 700° and 750° C. for 15 hours and then again ground dry for 1 hour.

Prismatic bodies having dimensions of approximately 6×6×18 mm are formed from the powders. The prismatic bodies are compressed isostatically at a pressure of 4 bar and then sintered at the temperatures indicated in the tables in a₁O₂ atmosphere for 2 hours. The density of the sintered prismatic bodies is determined by immersing in distilled water.

Rectangular discs having dimensions of approximately 5.5×5.5×0.5 mm are formed from the prismatic bodies and the surface hereof is provided, after lapping, with vapour-deposited gold electrodes.

The measurement of the values for the dielectric constant $\epsilon$ (T) and for the loss factor tan $\epsilon$ takes place at 1 kHz in the temperature range between −55° and +125° C. at a measuring voltage of <1 V. The warming-up rate was 10° C./minute.

As a result of the low sintering temperature of the composition in question a manufacture of multi-layer capacitors with silver electrodes is possible. An example is now given of the manufacture of multilayer capacitors having a ceramic material of the following composition:

$Pb(Ti_{0.4}Mg_{0.294}Mn_{0.006}W_{0.3})O_3 + 0.003(5PbO + 1WO_3)$.

The addition of 0.003 (5PbO+1WO₃) is added after calcination of the material of the basic compound.

As a starting material for the perowskite basic compound there is used PbO, TiO₂, MgO, WO₃ and Mn acetate in an extremely pure quality. These powders are weighed in accordance with their molar compositions and ground dry for 3 hours and subsequently calcined at 700° C. for 15 hours. The powders obtained in this manner are stirred to a suspension in water by adding a suitable binder, for example polyvinyl alcohol. From this paste 50 μm thick foils are moulded which after drying are printed with a silver paste to form the electrode layers. For the manufacture of a sandwich structure each time four foils provided with electrode paste and a foil without electrode paste are stacked and compressed. The binders of the electrode paste and of the green ceramic material are then fired in air within 24 hours by slowly heating to 400° C. Sintering takes place in air at 850°, 900° and 930° C. for 2 hours. After sintering the thickness of the dielectric layers was still 30 μm. The electrical properties of multilayer capacitors manufactured in this manner are recorded in table 8. Comparison of these values obtained in multilayer capacitors with the values measured in disc capacitors shows a good correspondence so that many of the data determined in disc capacitors (tables 1 to 7) can also be transferred to multilayer capacitors (table 8).

What is claimed is:

1. A lead titanate dielectric, the sintering temperature of which is below the melting-point of silver, and in which at least 50 mole % of the titanium is substituted by magnesium and tungsten, characterized in that the dielectric has a composition comprising the stoichiometric basic compound of the following formula:

$Pb(Ti_{1-x-y}Mg_xW_y)O_3$, wherein $0.25 \leq x \leq 0.35$ and $0.25 \leq y \leq 0.35$ and in addition 0.001 to 0.006 (5PbO+1WO₃) on an additive molar basis.

2. A dielectric as claimed in claim 1, characterized in that said dielectric has the following composition:

$Pb(Ti_{0.4}Mg_{0.3}W_{0.3})O_3 + 0.001$ to $0.006(5PbO + 1WO_3)$.

3. A dielectric as claimed in claim 2, characterized in that said dielectric has the following composition $Pb(Ti_{0.4}Mg_{0.3}W_{0.3})O_3 + 0.003(5PbO + 1WO_3)$.

4. A dielectric as claimed in claim 1, characterized in that said dielectric has the following composition:

$Pb(Ti_{1-(x+z)-y}Mg_{x-z}Me_zW_y)O_3 + 0.001$ to $0.006(5PbO + 1WO_3)$, wherein $0.288 \leq x \leq 0.299$ $y = 0.3$ $0.001 \leq z \leq 0.012$ and Me is at least one transition metal.

5. A dielectric as claimed in claim 4, characterized in that said dielectric has the following composition:

$Pb(Ti_{0.4}Mg_{0.294}Me_{0.006}W_{0.3})O_3 + 0.003(5PbO + 1WO_3)$.

6. A dielectric as claimed in claim 4, characterized in that at least one of Cr, Mn, Fe or Co is used as the transition metal.

7. A dielectric as claimed in claim 4 or 6, characterized in that said dielectric has the following composition:

$Pb(Ti_{0.4}Mg_{0.3-z}Me_zW_{0.3})O_3 + 0.003(5PbO + 1WO_3)$ wherein $z = 0.003$ to $0.009$ and wherein Me is one or more of the metals of the group consisting of Mn, Cr, Co and Fe.

8. A dielectric as claimed in claim 4, characterized in that said dielectric has the following composition:

$Pb(Ti_{0.4}Mg_{0.294}Me_{0.006}W_{0.3})O_3 + 0.001$ to $0.006(5PbO + 1WO_3)$:

wherein Me=Cr, Mn, Fe and/or Co.

9. A multilayer capacitor having a dielectric as claimed in claim 1.

10. A dielectric as claimed in claim 6, characterized in that said dielectric has the following composition: $Pb(Ti_{0.4}Mg_{0.3-z}Me_zW_{0.3})O_3 + 0.003(5PbO + 1WO_3)$ wherein z=0.003 to 0.009, and wherein Me is one or more of the metals Mn, Cr, Co and Fe.

11. A method of manufacturing a dielectric as claimed in claim 1, comprising the steps:

(a) mixing and grinding the compounds forming the stoichiometric basic compound together with the additional amounts of the PbO and WO₃;

(b) calcinating the resultant mixture at a temperature of from 700° to 750° C.;

(c) grinding and shaping the resultant calcined mixture and (d) heating said shaped mixture at a temperature of 800°–1000° C. to thereby form a densely sintered product.

12. A method of manufacturing a dielectric as claimed in claim 1, comprising the steps:

(a) mixing and grinding the compounds forming the stoichiometric basic compound;

(b) calcinating the resultant mixture at a temperature of from 700° to 750° C.;

(c) adding to, and mixing with, said calcined mixture the additional amounts of the PbO and $WO_3$;

(d) grinding and shaping the resultant mixture into a product of a desired configuration and (e) heating the resultant shaped product at a temperature of from 800° to 1000° C. to thereby form a densely sintered product.

* * * * *